United States Patent [19]
Vance, Jr. et al.

[11] Patent Number: 5,878,219
[45] Date of Patent: Mar. 2, 1999

[54] SYSTEM FOR INTEGRATING ACCESS TO PROPRIETARY AND INTERNET RESOURCES

[75] Inventors: Robert B. Vance, Jr., Powell; John C. Pampuch, Hilliard; Bruce A. MacNaughton, Columbus, all of Ohio

[73] Assignee: America Online, Inc., Dulles, Va.

[21] Appl. No.: 614,395

[22] Filed: Mar. 12, 1996

[51] Int. Cl.$^6$ ..................................................... G06F 15/16
[52] U.S. Cl. ................................. 395/200.47; 395/200.33
[58] Field of Search ........................ 395/200.03, 200.09, 395/200.11, 610, 200.48, 684, 200.33, 200.47, 200.49; 707/513

[56] References Cited

U.S. PATENT DOCUMENTS

| | | | |
|---|---|---|---|
| 5,347,632 | 9/1994 | Filepp et al. | 395/200.09 |
| 5,442,771 | 8/1995 | Filepp et al. | 395/200.09 |
| 5,530,852 | 6/1996 | Meske, Jr. et al. | 395/200.03 |
| 5,572,643 | 11/1996 | Judson | 395/200.09 |
| 5,594,910 | 1/1997 | Filepp et al. | 395/200.09 |
| 5,617,540 | 4/1997 | Civanlar et al. | 395/200.11 |
| 5,623,652 | 4/1997 | Vora et al. | 395/610 |

OTHER PUBLICATIONS

T. Berners–Lee et al., Uniform Resource Locators, Network Working Gourp 1738, pp., 1–25, Dec. 1994.

T. Berners–Lee, Universal Resource Identifiers in WWW: A Unifying Syntax for the Expression of Names and Addresses of Objects on the Network as used in the World–Wide Web, Network Working Group 1630, pp. 1–28, Jun. 1994.

Manger, Jason, Netscape Navigator, Chapter 2: URLs: Uniform resource locators, McGraw Hill Books, pp. 72–80, Dec. 1995.

Weiss, Jiri, Online services take the Web for a spin, PC World, p. 54–(full text only), Nov. 1995.

*Primary Examiner*—Parshotam S. Lall
*Assistant Examiner*—Patrice L. Winder
*Attorney, Agent, or Firm*—Standley & Gilcrest

[57] ABSTRACT

A system is disclosed that integrates through a single client application access to information resources from a proprietary online service and the Internet. Using a single Web-based client, subscribers enter selections regarding the type of information they would like to retrieve. Relevant information is retrieved from the Internet using the Uniform Resource Locator (URL) addressing scheme of the Internet to locate information on the Internet. Relevant information is retrieved from the online service using extensions to the URL addressing scheme. The extensions map to a proprietary protocol used to obtain information resources from the online service. The client application understands the URLs and extended URLs and manages presentation of the information regardless of the source. Using the present invention, subscribers to online services are no longer required to toggle between a Web browser and service provider communication software in order to view content from both locations.

6 Claims, 6 Drawing Sheets

SYSTEM FOR INTEGRATING ACCESS TO PROPRIETARY AND INTERNET RESOURCES

BACKGROUND OF THE INVENTION

1. Field of the Invention

The present invention relates generally to methods for accessing information resources located on an online service and the Internet. Particularly, the present invention relates to system and method for using a single access mechanism to search and view content from an online service and the Internet. In a preferred embodiment of the present invention, extensions to the Uniform Resource Locator (URL) addressing scheme of the Internet facilitate access to information resources from alternative sources such as an online service comprised of information resources accessible via proprietary protocols.

2. Description of the Related Art

Online services today offer a variety of services to their subscribers. Subscribers may access news, weather, financial, sports, and entertainment services as well as participate in and retrieve information from online discussion groups. For example, a subscriber of the CompuServe® Information Service may view and retrieve information on a wide variety of topics from repositories located throughout the world. The repositories may be maintained by the service provider or by third party providers who make their information and services available via the worldwide network of computers that comprise the online service.

A subscriber to an online service typically accesses the service using special communication software (a.k.a., client application or client software) that establishes and manages a connection from the subscriber's computer (or client) to the service provider's host computers (or servers) and facilitates the subscriber's interactions with the service. For example, subscribers to the CompuServe Information may use the CompuServe Information Manager for Windows (WinCIM—a graphical based tool for accessing CompuServe's basic/extended news services and discussion groups (forums) as well as electronic mail In addition to managing the connection, the client communication software displays pages or screens relating to retrieved content according to views or presentations specific to the online service. For example, if information is retrieved from a discussion group, the client communication software may display a screen with a first icon for accessing files contained in libraries and a second icon for accessing messages submitted by subscribers. After selecting the first icon, the subscriber may be present with a list of library files from which to use. The functionality of the discussion group and the user interface (i.e., icons, dialog boxes, menus, etc.) for interacting with the discussion group are dictated by the service provider and hence, represent views or presentations specific to the online service.

Interactions between the subscriber's computer and the service are facilitated by a variety of software protocols (i.e., communication conventions, rules, and structures), including application level protocols, for managing the transfer of data across the network and to the client application on the subscriber's computer. A protocol may be proprietary or exclusive to a service such that only client software from the service provider may be used to communicate with the server software. For example, an online service that supports electronic mail, discussion groups, chat groups, news services, etc. may define and use specific protocols for each type of service so that appropriate information is exchanged between the participants (i.e., clients and servers). Each application-specific protocol may be based on a common, underlying protocol.

The Internet and World Wide Web (WWW), comprised of a vast array of international computer networks, provide online service subscribers with additional information resources to search. Typically, these resources are accessed using a Web browser, such as Spry's Mosaic, capable of understanding the HyperText Markup Language (HTML) used to create the documents found on the WWW and the HyperText Transfer Protocol (HTTP) used to navigate the WWW. Although Web browsers typically have varying levels of functionality or sophistication, retrieved content is displayed in content pages according to views or presentations specific to the Web document currently presented by the Web browser. Typically, the views and presentations are different than those provided by the communication software from the online service because the Web browser is, in fact, a separate client application displaying Web documents containing presentation directives.

Although online services and the Internet provide vast information resources, subscribers who wish to access both service provider and Internet resources in order to research a particular topic may find the task difficult and cumbersome to perform because subscribers must use a first client application to access the service (e.g., WinCIM) and a second client application to access the Internet (e.g., Mosaic). In some instances, both client applications may be running (one active, one inactive) and capable of sharing a single connection so that the subscriber may toggle between the applications in order to complete the research task. Despite the convenience in the ability to toggle between the two applications, the subscriber is nonetheless required to learn both applications which have dissimilar user interfaces. Furthermore, the search results are separated because the searches are performed independently of one another and retrieved content is displayed in two separate application presentations. Although one physical connection may be shared, the logical connections, as provided by two different client applications, are separate.

For example, a subscriber may wish to perform research on the topic of Doberman dogs on an online service and the Internet. The subscriber may begin by invoking the online service provided client application and accessing a discussion group devoted to dogs. The subscriber may then search the discussion group libraries by entering a query such as "Doberman" in a dialog box. The client application may then display the results of the search in a first window. After browsing the results of the search, the subscriber may decide to perform the same search on the Internet. The subscriber may toggle to the Web browser client application and enter the same query in a browser dialog box. The browser may then display the results of a search of Web sites, Usenet news groups, etc. in a second window. Although the subscriber may find information from both sources to be of interest, the process of finding the information is time-consuming and potentially confusing because the subscriber must perform the same search twice using two different client applications that use dissimilar presentations.

SUMMARY OF THE INVENTION

The present invention (the Resource Integrator) addresses the problems and limitations of current technology in which two separate client applications are needed to search and view results from both an online service and the Internet. The present invention integrates access to a proprietary online service and the Internet through a single client application. The present invention allows a subscriber to perform searches without regard to the location of the content (from the service or the Internet) and view the results in accordance with presentations managed by the client application without regard to the content source (the service provider or the Internet). In a preferred embodiment, a standard Internet addressing scheme is used to retrieve content from the Internet while extensions to the Internet addressing scheme are used to retrieve content from the online service. The use of a uniform addressing scheme to retrieve content from all sources allows an online service subscriber to use a single client application to access information resources from both the service provider and the Internet. The present invention is comprised of three primary components: (1) extensions to the standard Uniform Resource Locators of the Internet (the extended URLs are called XURLs); (2) client application software (Resource Integrator client) for the subscriber's computer that is capable of processing messages in accordance with URLs and XURLs; and (3) server software (Resource Integrator server) located at the online service for processing messages in accordance with the URLs and XURLs.

DETAILED DESCRIPTION OF PREFERRED EMBODIMENT(S)

Uniform Resource Locators

Figure 1:
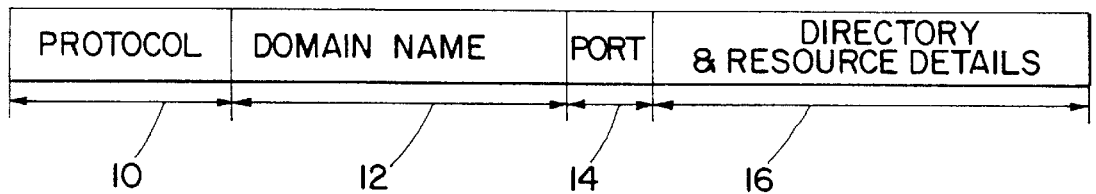
FIG. 1 is a diagram of the structure of an Internet Uniform Resource Locator.

A Uniform Resource Locator (URL) is a mechanism for accessing resources on the Internet. A URL is used on the Internet to address resources such as HTML documents, images, sound files, database search engines, etc. It is a text-string (i.e., single line of printable ASCII characters that may be viewed as an identifier for the resource) that may be used to reference data or any resource on the Internet including the results of software application commands. Referring to FIG. 1, a URL follows a specific structure and syntax The structure of a URL is shown in FIG. 1. The first part of the text string 10 defines the protocol or scheme to be used in processing the string. For example, the protocol may be one of the following:

| | |
|---|---|
| http | HyperText Transfer Protocol |
| ftp | File Transfer Protocol |
| Gopher | Program and associated protocol for reading information from the Internet |
| news | Usenet newsgroup |
| WAIS | Wide Area Information Server |

The next field 12 indicates an Internet Domain Name of a site on which a server capable of processing the request embodied in the URL is running. For example, the domain name may be one of the following: www. compuserve. com, www.wow. com, etc.

The Port Number 14 is optional and is used to indicate the port number of the server to which the request is to be directed. If not present, the browser or client application assumes a commonly understood default value of the indicated protocol.

The last field 16 defines the location of the resource. In many instances, a directory structure that leads to a particular file is supplied (e.g., /path/subpath/file.ext). The location may also indicate an application or script and associated search string (e.g., /cgi-bin/srch-data?archie +database).

For simplification, Internet URLs may be viewed as taking the form:.

```
access_method:application_info
where:
    access_method    specifies the communications model used to
                     access the data. Examples include: http, ftp,
                     telnet, news.
    application_info is dependent on the specific access method.
                     In http, and others, the application info is
                     divided into more parts as follows:
                     //host_name:port/object_name
                         where:
                             host_name is the name of the
                                 server providing the data.
                             port (not always used) is the
                                 socket port to connect to.
                             object_name is the name of the
                                 object on the server, typically
                                 in the form of a path name, or
                                 some other hierarchical
                                 notation.
```

As may be apparent, the URL scheme of the Internet is flexible and adaptable. Each URL indicates how and where to access a resource. The "how"(i.e., access method) portion is based on widely known and used methods so that the information shared between the client and application server is simply an identifier for the appropriate access method. The "where" portion also follows well-known conventions so that application servers need only information about the hierarchy in order to process a client request.

Online Information Service Resources

Within an online service such as the CompuServe Information Service, resources may be viewed as objects such as discussion group messages, discussion group library files, news databases, etc. Although accessible via a proprietary protocol, these same objects may be identifiable via extensions to the URL scheme of the Internet. The objects of the online service may also be treated as resources identifiable in accordance with the Internet URL scheme and ultimately, accessible via the proprietary protocol. Extensions to the URLs facilitate access to the online service objects (i.e., resources) just as standard URLs facilitate access to Internet resources. The system and method of the present invention, based on extensions to URLs, thus allows online service objects to be accessed in a manner similar to that for accessing Internet resources. The URL extensions, unique to the present invention, define a uniform resource identification scheme that allows online service subscribers to use a single client application for accessing information resources regardless of their location.

URL Extensions (XTRLs)

In a preferred embodiment of the present invention, the URL extensions are primarily intended for use as links to objects, although in some contexts, embedded references may be used. Preferably, the extensions relate to application protocols that have been developed to support the online service. In other words, the extensions provide a mapping to existing protocols and ensure that information needed for processing the request according to the existing protocol is provided. The XURLs are interpreted by the Resource Integrator client so that communications with server applications that understand only the existing protocol may be established. Using this technique, client and server software that supports the existing protocols need not be changed to accommodate the use of XURLs.

In following the conventions for Internet URLS, the first part of the extension describes additional access methods for retrieving local and remote content from the online service. This content is managed by providing first, a new set of access methods, and for each access method, providing object details that describe different types of objects available within each access method. For example, in accordance with a preferred embodiment of the present invention, the following access methods—that preferably relate to existing protocols used by the online service—may be defined:

| URL Access Method | Related Existing Protocol |
|---|---|
| X-CSIDAP | Display Application Protocol |
| X-CSIFAP | Discussion Group Application Protocol |
| X-CSINSP | News Service Application Protocol |
| X-CSIRTC | Real Time Communication Application Protocol (such as Chat or Conference sessions) |
| X-CSIEMP | Electronic Mail Application Protocol |
| X-CSIHMI | Common Application Protocol |

One or more objects may be associated with each access method. The objects define the additional information needed to process requests for the services identified by each access method. This scheme permits HTML documents specific to the online service and other contexts in which URLs are used to refer to many online service protocol objects in a form that is consistent with URLs used to access Internet resources.

The additional information for the access methods is preferably, formatted similarly to HTTP URLs. Preferably, the HTTP URL host_name field for the online service access method is a name for a specific service. Preferably, it follows the same general form (e.g., "CIS:PSG-80", etc.) As with HTTP URLs, the service name component of the extended URL is, preferably, separated from the object_ name field by a single slash character. The objects for the various access methods that may be referenced using extended URLs may be defined as shown in Appendix A.

The Partial URL notation that is part of the standard URL notation is valid as a part of this notation for the extended URLs of the present invention. For example, an HTML message that is located within a discussion group may reference a library file in that same forum by using a notation such as:

X-CSIFAP:library.file/34234

This URL references file number 34234 in the same forum

Figure 2:
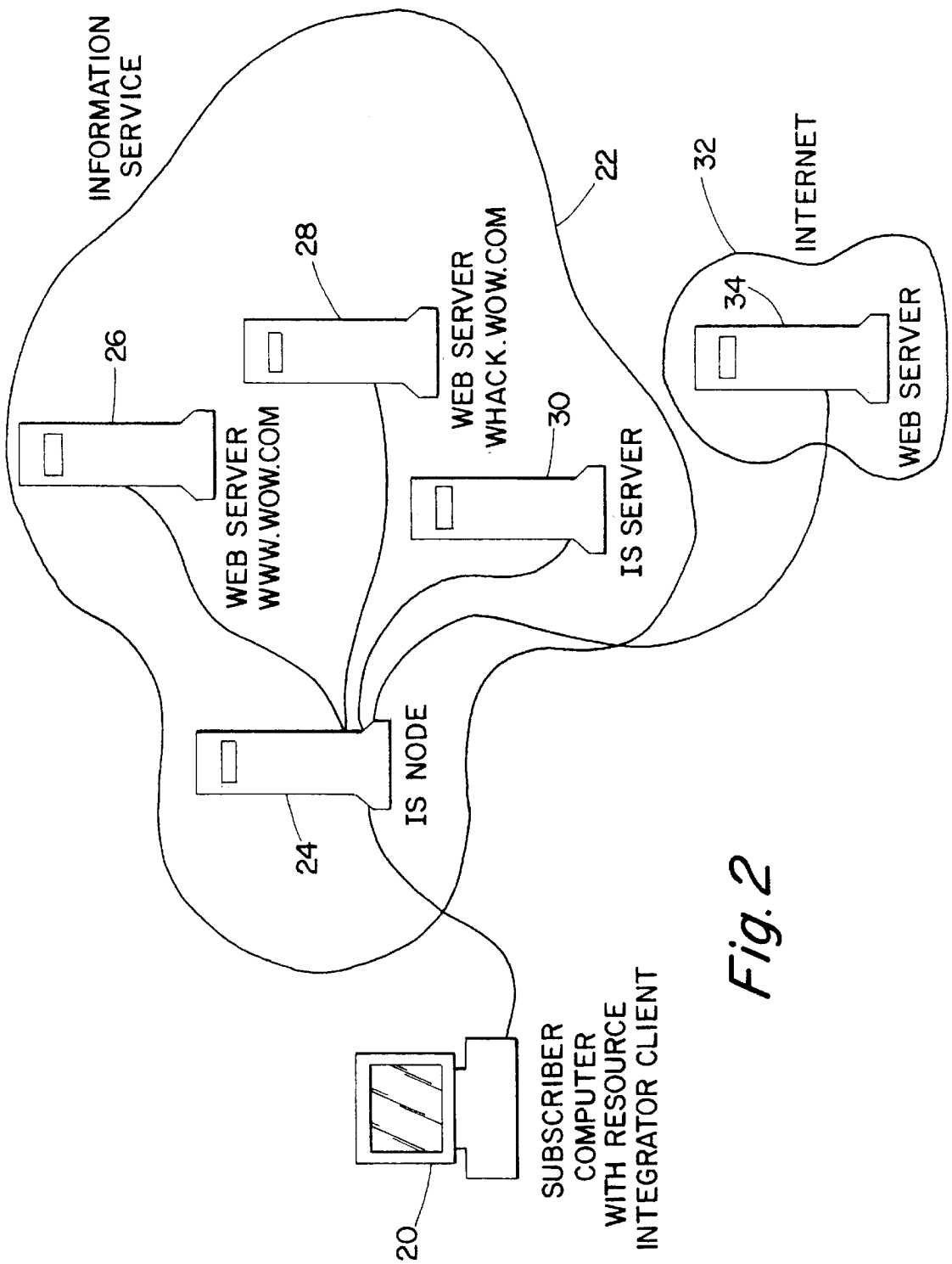
FIG. 2 is a system organization diagram of the primary components of the present invention.

Referring now to FIG. 2, a system organization diagram of the hardware (and associated software) components for a preferred embodiment of the present invention is shown. Typically, online services 22 are comprised of a large number of network node 24 and host computers (or servers) 26, 28, 30 in communication with one another via a wide area network. Online service network node computers 24 may also be in communication with the Internet 32 so that users of the Internet may connect directly to the online service 22 or they may send communications to subscribers of the online service. In addition, subscribers 20 to the online service may access servers 34 throughout the Internet 32.

The online service subscriber 20 accesses the online service 22 via a network node computer 24. The Resource Integrator client running on the subscriber's computer facilitates the subscriber's interaction (via display pages to record subscriber selections) with servers 26, 28, 30, 32 that provide the requested services. After determining the subscriber's area of interest (e.g., based on a topic and action), content pages relating to the subscriber's selections may be retrieved. Preferably, the Resource Integrator is capable of determining, based on information in a URL or XURL, whether a content page is to be displayed in accordance with an online service view (which may be based either on an Internet protocol or on an existing proprietary protocol) or a Web browser view. In other words, the URLs and XURLs specify the communication requirements (Internet or existing proprietary protocol) between the Resource Integrator client and server application software. Determination of the proper view allows both online service content and Internet content to be displayed via interaction with a single Resource Integrator client application.

The Resource Integrator client and server application software is, preferably, designed to conform to specifications and conventions used in developing Web-based products. In other words, the subscriber interacts with a Web-based product (Resource Integrator client) 20 that communicates with the online service (Resource Integrator servers) 26, 28 via the HTTP protocol of the Internet. Initially, the subscriber's interactions are with Resource Integrator pages that are Web pages with which the subscriber interacts to communicate information regarding the tasks to be completed. Depending upon the subscriber's actions and requests, additional displays may be Resource Integrator pages from the online service that facilitate determination of the subscriber's desired actions 26, 28, Web content pages from other Internet Web sites 32, or content pages in accordance with the existing proprietary protocols used by the online service 30.

Figure 3A:
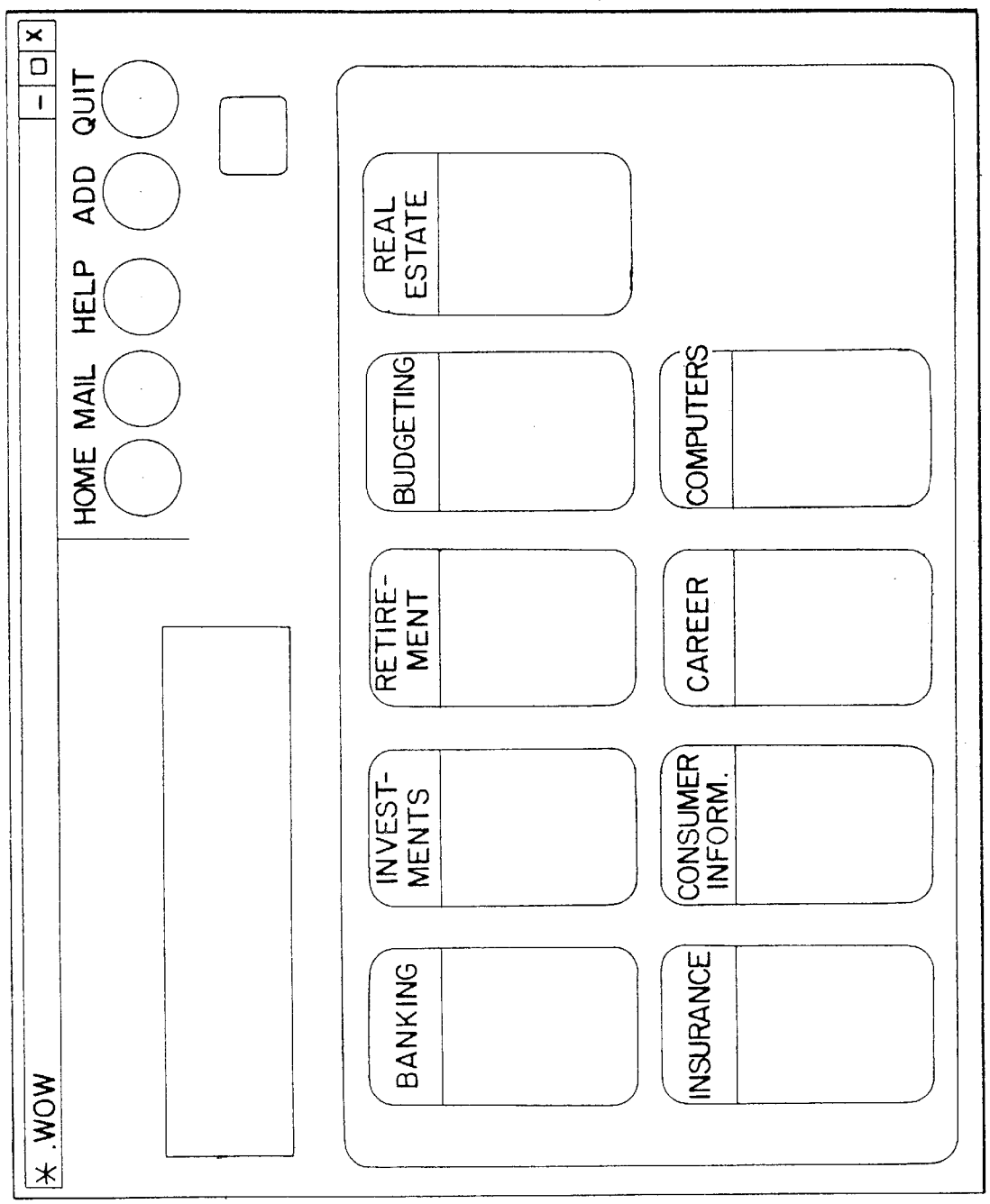
FIGS. 3A–3C are examples of screen displays in accordance with a preferred embodiment of the present invention.
Figure 3B:
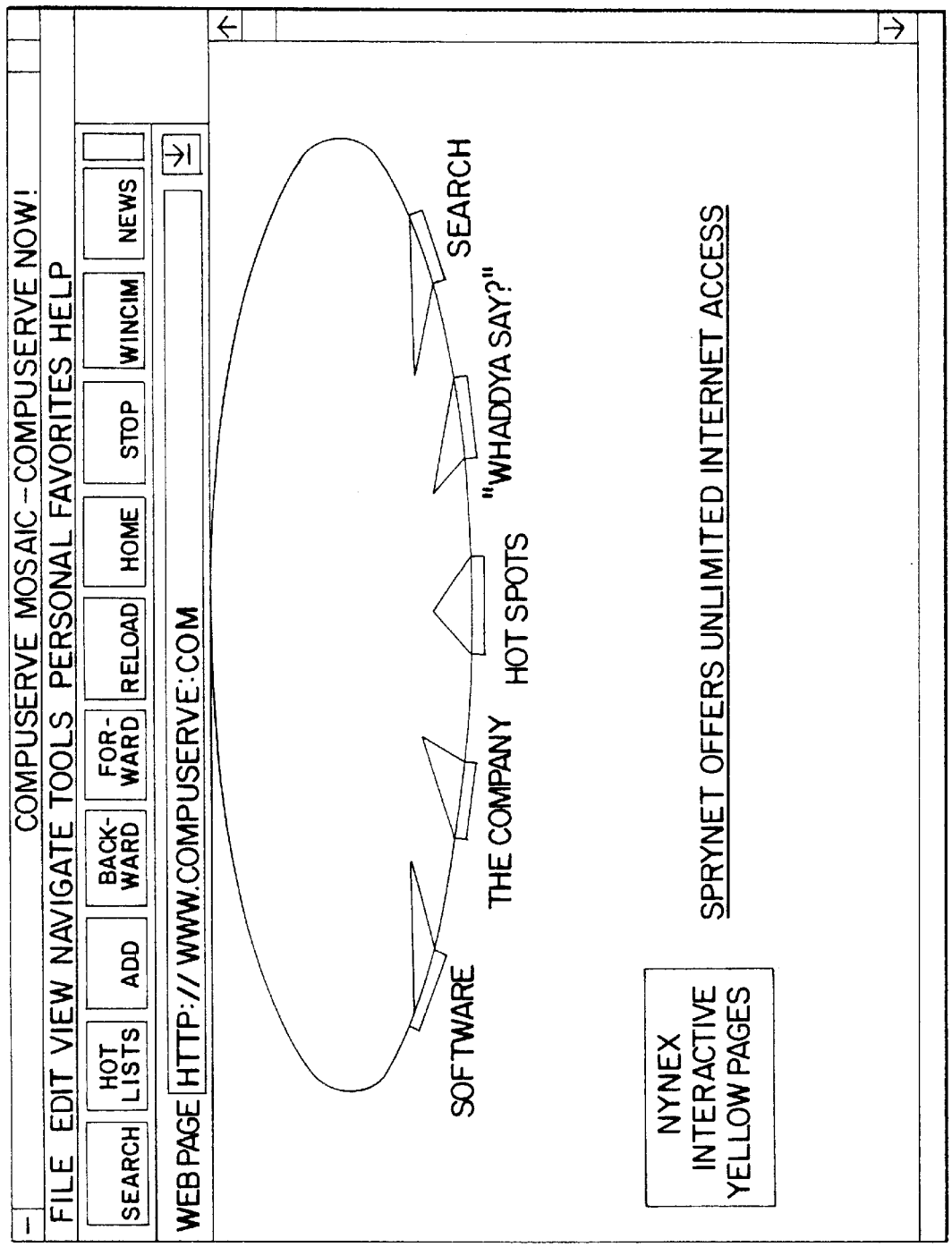
Figure 3C:
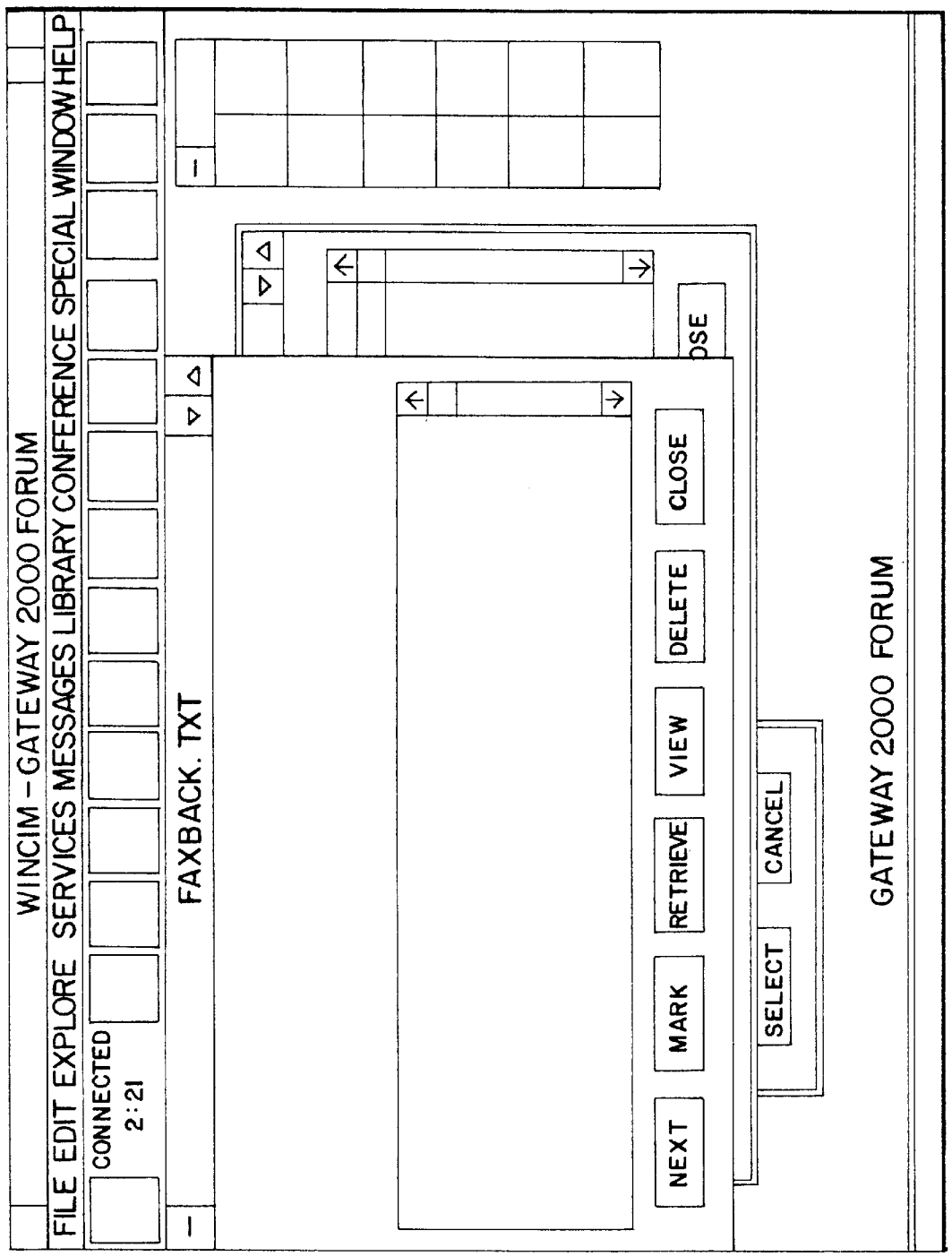

Referring to FIG. 3, examples of the three types of pages in accordance with the present invention are shown. FIG. 3A is an example of a Resource Integrator page. FIG. 3B is an example of an Internet Web content page. FIG. 3C is an example of a content page in accordance with an existing proprietary protocol of the online service. The content pages facilitate viewing of the located information resource.

Conformance of the Resource Integrator client to Web based product specifications and conventions facilitates the use of URLs and XURLs for locating information resources on the Internet and through the online service. Furthermore, the pages of the Resource Integrator that comprises the subscriber's interface with the online service are Web pages that may be identified via URLs. For example, a page that contains a list of items that reference both online service and Internet information resources may itself be based on specifications and conventions used in displaying Web pages.

Figure 4:
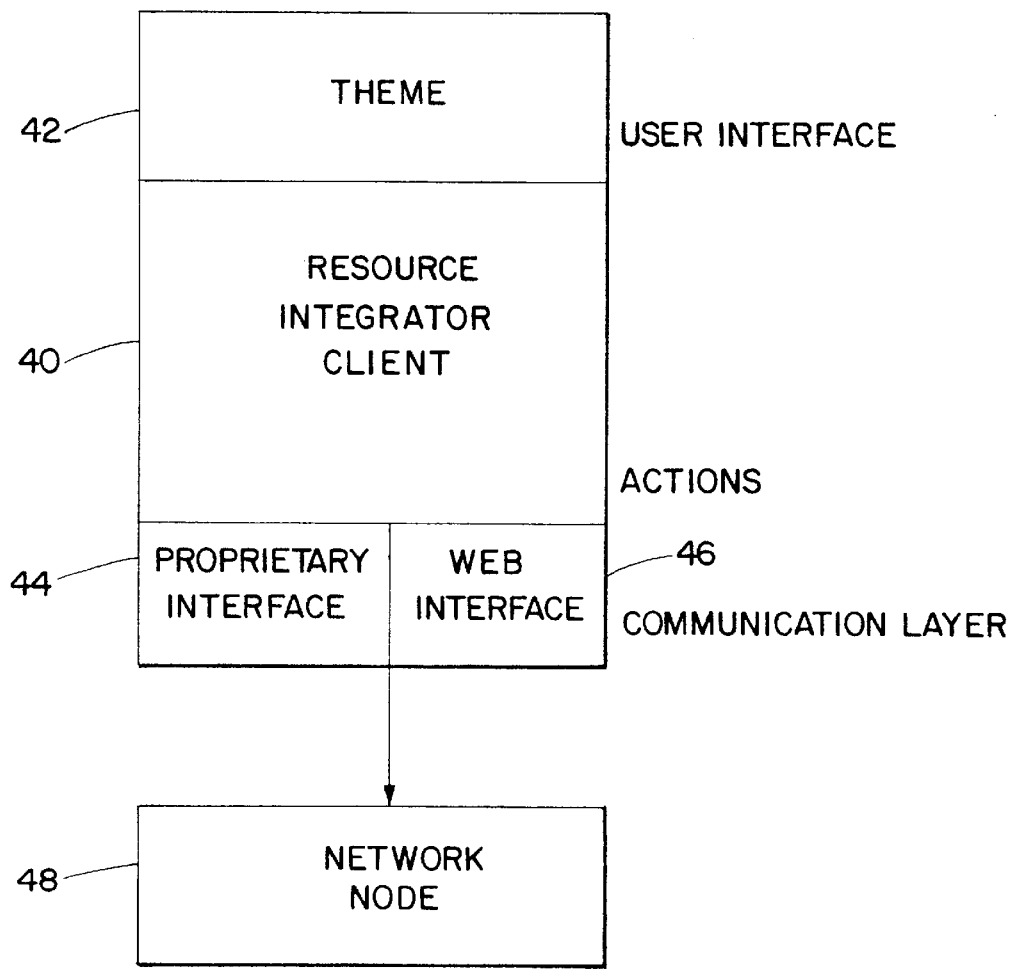
FIG. 4 is system organization diagram of the primary software components of the present invention.

Referring to FIG. 4, a system organization diagram of the primary software components for a preferred embodiment of the present invention is shown. The Resource Integrator client 40 manages the interactions between the subscriber and the servers of the online service and the Internet (via a network node computer 48). Preferably, various user interface themes 42 are implemented on top of the Resource Integrator client so that subscribers may choose a particular style of interface for interacting with the online service. The Resource Integrator manages communications with the online service using both a proprietary interface based on existing protocols 44 and a Web interface based on the HTTP protocol 46.

Preferably, the URLs used by the Resource Integrator client and server application software for Resource Integrator pages are easily recognizable to humans without the aid of tables, charts, conversions, etc. Preferably, the URLs are also easily creatable by humans without being prone to error. Therefore, the Resource Integrator client/server application URL specification, preferably, uses elements that closely mimic the organization of the client application software and does not employ codes, abbreviations or other cryptic syntax.

The Resource Integrator client application software facilitates a subscriber's interactions with the online service and the Internet. In the preferred embodiment of the present invention, all information resources are located using a URL or XURL. The URLs and XURLs point to content pages inside and outside the online service. The identifiers are then interpreted to locate the desired content. Preferably, the transformation of a requested URL or XURL to actual content is invisible to the so the subscriber is not required to use URLs or XURLs directly at anytime. Preferably, the URL format does not imply a specific means by which the requested content is stored on the server nor does it exclude specific server storage mechanisms.

Because the client application software is Web-based (and hence, uses Web pages to facilitate a subscribers interactions in locating online service and Internet based information resources), the Resource Integrator client and server application software may communicate via HTTP. In addition to using HTTP in a preferred embodiment of the present invention, the Common Gateway Interface (CGI) scheme of Web-based products is used to retrieve appropriate Resource Integrator pages. The CGI allows the HTTP server processing requests for the Resource Integrator to activate additional programs and perform additional processing on data from the client or other sources. Preferably, a CGI perl script called GET is used to translate the client application URLs and retrieve the appropriate page.

In a preferred embodiment of the present invention, the URL format for retrieving Resource Integrator content pages is as follows:

http://wow-server/cgi-directory/cgi-command?tag=value[&tag=value...]

where

| | |
|---|---|
| wow-server | The fully qualified domain name of the server. Currently, all content pages for the Resource Integrator client application itself uses one of the following special, well-known domain names: |

| Domain Name | Description |
|---|---|
| www.wow.com | Pages in this domain are automatically displayed in the client's web browser view. |
| whack.wow.com | Pages in this domain have the URL parsed by the client to determine the proper view in which the page should be shown to the user. If a view matching the characteristics specified in the URL is not found, the client's web browser view is used. |
| cgi-directory | The web server's cgi directory that contains the programs used to parse Web content URLs. Currently, all content for the client application uses the same cgi directory: cgi-bin. |
| cgi-command | The web server's cgi command that is used to parse web content URLs. Currently, all content uses the same cgi command: get. |
| tag | A case-sensitive string constant specifying a client characteristic or selection. Note that while most tags are provided with the URL, the clientid tag is an exception in that it must be appended by the client. |

| Tag | Provided By | Description |
|---|---|---|
| browser | server | Unconditionally display the content identified by this URL in the web browser view. |
| category | client, server | In the USA Standard theme, the main menu cards. The category tag and the center tag are mutually exclusive in any given URL. |
| center | client, server | In the USA Standard theme, one of the Centers accessed directly via the pogs on the main menu (e.g. New Center, Mail Center, etc.). The center tag and category tag are mutually exclusive in any given URL. |
| clientid | client | The client software's signature ID. Typically, this ID will include the client name (e.g. WOW) along with it's version number (e.g. 100). The web server can assume that the user is utilizing the client application software if this tag is provided in the URL. |
| community | client, server | In the USA Standard theme, the subcategories. |
| document | server | A web document filespec. |
| section | server | A community/service section name. |
| service | server | In the USA Standard theme, the tool pogs plus "What's New". |
| view | server | A client view name. Unconditionally display the content identified by this URL in the specified view. |
| theme | server | A theme name. |

| | -continued |
|---|---|
| value | A case-sensitive string literal. Values vary based upon the tag they are associated with, and, with the exception of userid values, are theme-specific. |

Figure 5:
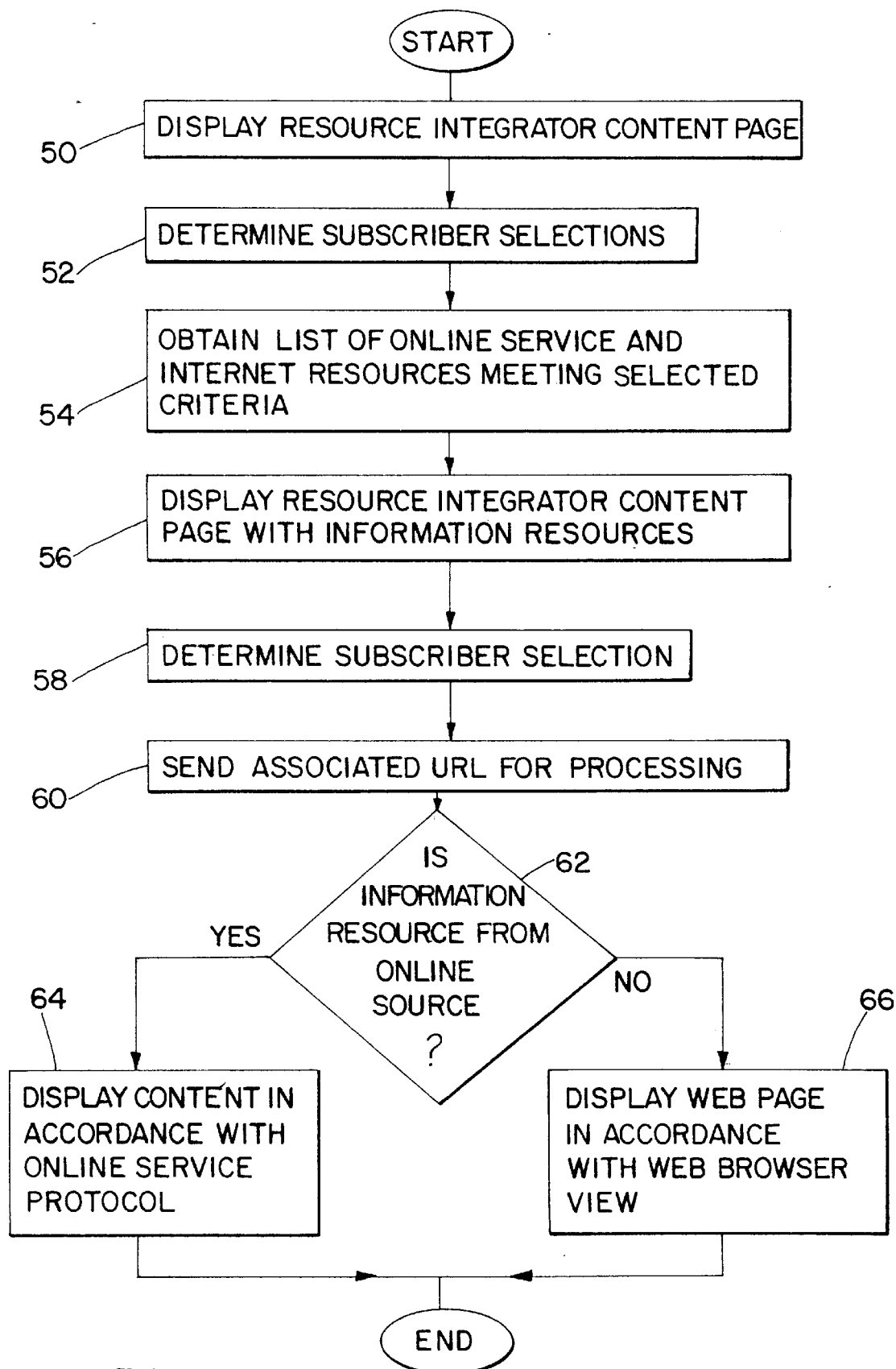
FIG. 5 is a flow diagram of the primary steps for a preferred embodiment of the present invention.

Referring to FIG. 5, a flow chart of the subscriber process for accessing information resources from an online service and the Internet is shown. Initially, a Resource Integrator page is displayed by the Resource Integrator client to the subscriber 50 so that the subscriber may make selections regarding topics and actions of interest 52. The subscriber may interact with several pages before all selections are determined. Following the subscriber selections, the Resource Integrator server creates a list of online service and Internet resources meeting the selected criteria 54. The options that meet the selected criteria may be associated with URLs or XURLs. Another Resource Integrator page is used to display the results to the subscriber 56. The subscriber may then make a selection from the list of options 58. The URL or XURL associated with the selection is sent to the server for processing 60. The Resource Integrator client looks 62 at the URL to determine whether the retrieved content page should be displayed in accordance with an online service protocol or in accordance with a Web browser view. The ability of the Resource Integrator to manage the presentation of information from either source provides the seamless integration of online service and Internet resources.

In order to attract and keep new subscribers, online services have attempted to increase the amount of available information. The ability to locate information resources on the Internet is one way in which online services are able to increase the amount of information available to subscribers. The present invention facilitates subscriber's interactions with both the online service and the Internet by providing seamless integration of the two via a single client application capable of retrieving and displaying for the subscriber online service and Internet content.

The present invention is described in detail with specific reference to a single preferred embodiment and certain alternatives. However, there is not intent to limit the invention to the particular embodiment of specific alternatives. The true scope and spirit of the present invention is defined by the following claims.

Appendix A

X-CSIDAP Objects within DAP (Display Application Protocol) are directly defined by their service name and require no additional identification in the URL. That service name is placed in the host name portion of the URL The object_name portion of the URL is used only for identifying the type of the object being referred to. These types may be one of the following list:

Article
Menu
File
Dialog
DPP
Terminal
or
one of the other host content access methods like X-CSIFAP.
Also, if this field is not present, the object type is not specified.

In addition, a reference to a Display object may be identified as volatile by appending a volatile keyword as shown in the examples. The addition of this keyword indicates that this object should be requested (or validated) each time the item is selected by the user. Although the referenced object may or may not be cached, the relationship between the hotlink and its target object preferably, is not maintained.

Examples:

X-CSIDAP://CIS:TOP/Menu
X-CSIDAP://CIS:HMINEW/Menu.volatile
X-CSIDAP://CIS:PSG-80/X-CSIFAP
X-CSIDAP://CIS:CIS-NEW/Article
X-CSIDAP://CIS:CIS-NEW/Article.volatile X-CSIFAP Within FAP (Forum Application Protocol), there are three major categories of services: Message Board, File Libraries, and Conferences. The object_name field in a FAP URL may be arranged as follows:

/category object_type/identifier where category is one of general, message, library or conference.

Within these categories, different object types exist, and the identifiers (and interpretation of the identifiers) vary for those different object types. The object_types for these categories may be defined as follows:

```
general:
    bulletin
        integer: bulletin number
    member-interests
        string: user id
message:
    section-list
        no parameters
    section
        integer: section id of the section
    message
        integer: absolute message number of the message
    thread
        integer: thread id of the thread within the forum
    description
        no parameters
    section-description
        integer: section id of the section
library:
    section-list
        no parameters
    section
        integer: section id of the section
    file-description
        integer: catalog number of file
    file
        integer: catalog number of file
    description
        no parameters
    section-description
        integer: section id of the section
conference:
    conference-list
        no parameters
    conference
        integer: section id of the conference
```

-continued

```
    description
        no parameters
    conference-description
        integer: section id of the conference
    User-List
        no parameters
```

For example, a reference to a message is the entire message itself. In contrast, a reference to a message section is may be a view of that section which may be manifested as a self-expanding list of all of the message threads within that section.

Examples:

X-CSIFAP://CIS:IBMCOM/message.section-list is a reference to the section list in the IBMCOM forum.

X-CSIFAP://CIS:WINFUN/message.message/56312 is a reference message #56312 in the CIS:WINFUN forum.

X-CSIFAP://CIS:WINSDK/library.file-description/32813 is a reference to a file description in the CIS:WINSDK forum.

X-CSINSP The online service News Service Protocol (NSP) provides a variety of accessible objects. Like FAP, these objects may be identified by a combination of service name and object name. NSP categorizes its objects using the following identifiers:

```
    folders:
        no parameters
    folder:
        integer: folder id
    story:
        integer: story id
    story-lead:
        integer: story id
```

A reference to the folders in a news service is the list of available folders. A reference to a folder is a list of the stories in that folder.

Example

X-CSINSP://CIS:ENS/story/1432 is a reference to the ENS story numbered 1432.

X-CSIRTC Real Time Conferencing (RTC) Application like CB have container objects (sometimes called Rooms or Channels) as well as more traditional objects (like room lists.) Although managed differently from the other online service protocol, these objects may be identified similarly using this URL convention. The RTC identifiers are specified as follows:

```
    Room:
        integer: room number
    Rooms:
        no parameters
    Room-Description:
        integer: room number
    User-List:
        no parameters
```

Examples:

X-CSIRTC://CIS:CB-1/Room/17
X-CSIRTC://CIS:CB-2/User-list

X-CSIEMP This access method provides references to user email objects in the online service common protocol. These objects are generally limited to the subscriber's own email messages, but can be used to generate references to other parrts of email messages sent by subscriber. There are two basic identifiers type in Email:

```
    Messages:
        no parameters
    Message:
        string: message id . integer: part number
```

Examples:

X-CSIEMP://CIS:MAILHMI/Messages
X-CSIEMP://CIS:MAILHMI/Message/5431-3234
X-CSIEMP://CIS:MAILHMI/Message/5662-2313.3

X-CSIHMI This access method is used to reference HMI protocol objects. These objects do not require a specific service name to be specified. The following object types are defined:

```
Weather:
    String: location identifier
Quotes:
    String: ticker identifier
ImageRef:
    String: format.sheet.version.image
    where format is either 'GIF', 'JPG', or 'PNG' (or others). The
    version and image fields of an image ref are optional. When
    version is not present, no version checking is performed. When
    image is not present, the ImageRef is interpreted as a single
    image rather than a bundled sheet.
```

Examples:

X-CSIHMI:/Weather/Local
X-CSIHMI:/Weather/Columbus
X-CSIHMI:/Weather/Columbus.Ohio
X-CSIHMI:/Quotes/HRB
X-CSIHMI:/ImageRef/GIF.0x19C.4
X-CSIHMI:/ImageRef/GIF.0x21C.3.1
X-CSIHMI:/ImageRef/GIF.0x21C..2

The Local CD ROM Objects take a slightly different form In the previous URL specifications, the host name portion of the URL is filled by a service name identifier, and the object name is specific to the access method. In CD ROM objects, the host name field is used to identify the CD ROM volume, and the object name is the full (or partial) path name of the file on the CD ROM.

Preferably, the volume name is encoded exactly as it is encoded on the CD. The volume name appears in the form of VYYM where V is the volume number, YY is the year of release, and M is the target machine.

Examples:

X-CSICDROM://394W/COVER/COVER/LOGO3.AVI
X-CSICDROM://394W/LEISURE/GAMES/OMF.DOC

What is claimed is:

1. A computer information system, comprising:
    information resources accessible in accordance with a first protocol;
    information resources accessible in accordance with a uniform addressing scheme;
    extensions to said uniform addressing scheme, said extensions mapped to said first protocol:

a first address in accordance with said uniform addressing scheme:

a second address in accordance with said extensions to said uniform addressing scheme;

servers capable of storing said information resources accessible in accordance with said first protocol and said information resources accessible in accordance with said uniform addressing scheme; and a client application for communicating said first address and said second address to said servers to access said information resources accessible in accordance with said first protocol and said information resources accessible in accordance with said uniform addressing scheme, said client application capable of displaying content pages for said information resources accessible in accordance with said first protocol and said information resources accessible in accordance with said uniform addressing scheme.

2. The system of claim 1, wherein said first protocol is a propriety protocol for accessing information resources from an online service.

3. The system of claim 1, wherein said uniform addressing scheme is the Internet Uniform Resource Locator addressing scheme.

4. The system of claim 1, wherein said client application is a Web-based product.

5. A system for locating information resources of a first type and information resources of a second type, comprising:

a protocol for locating said information resources of said first type;

an addressing scheme for locating said information resources of said second type;

extensions to said addressing scheme, said extensions mapped to said protocol for locating said information resources of said first type;

a client application capable of interpreting identifiers in accordance with said addressing scheme and said extensions to said addressing scheme; and content pages for said information resources, said content pages displayed by said client application in accordance with said client application's interpretation of said identifiers.

6. The system of claim 1, wherein said addressing scheme is the Internet Uniform Resource Locator addressing scheme.

* * * * *

UNITED STATES PATENT AND TRADEMARK OFFICE
CERTIFICATE OF CORRECTION

PATENT NO. : 5,878,219
DATED : March 2, 1999
INVENTOR(S) : Vance, Jr., et al

Page 1 of 2

It is certified that error appears in the above-indentified patent and that said Letters Patent is hereby corrected as shown below:

In column 1, line 39, please delete "(WinCIM" and replace it with -- (WinCIM) --.

In column 3, line 51, please insert after "syntax" the following: -- . --.

In column 4, line 10, please delete "archie +database" and replace with --archie+database--.

In column 5, line 60, please insert after "forum" the following: -- . --.

In column 5, line 60, please insert a line space after "forum.".

In column 9, line 52, please insert after "URL" the following: -- . --.

In column 10, line 24, please insert a line space after "volatile".

In column 11, line 45, please delete "Application" and replace with -- Applications --.

In column 12, line 4, please delete "identifiers" and replace with -- identifier --.

In column 12, line 4, please delete "type" and replace with -- types --.

In column 12, line 16, please insert a line space after "2313.3".

UNITED STATES PATENT AND TRADEMARK OFFICE
CERTIFICATE OF CORRECTION

PATENT NO. : 5,979,219
DATED : March 2, 1999
INVENTOR(S) : Vance, Jr., et al

It is certified that error appears in the above-indentified patent and that said Letters Patent is hereby corrected as shown below:

In column 12, line 38, please delete "Ohio" and replace with -- Oh --.

In column 12, line 44, after form please insert the following -- . --.

Signed and Sealed this

Twenty-third Day of November, 1999

Attest:

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT : 5,878,219

DATED : March 2, 1999

INVENTOR(S) : Robert B. Vance, Jr. et al

It is certified that error appears in the above-identified patent and that said Letters Patent is hereby corrected as shown below:

In the table under column 8, under Description, line 8, please delete "New" and replace with --News--.

Signed and Sealed this

First Day of February, 2000

*Attest:*

*Attesting Officer*

Q. TODD DICKINSON

*Acting Commissioner of Patents and Trademarks*